Feb. 14, 1939.  C. GARDNER  2,147,290
ENGINE
Filed March 25, 1933  4 Sheets-Sheet 2

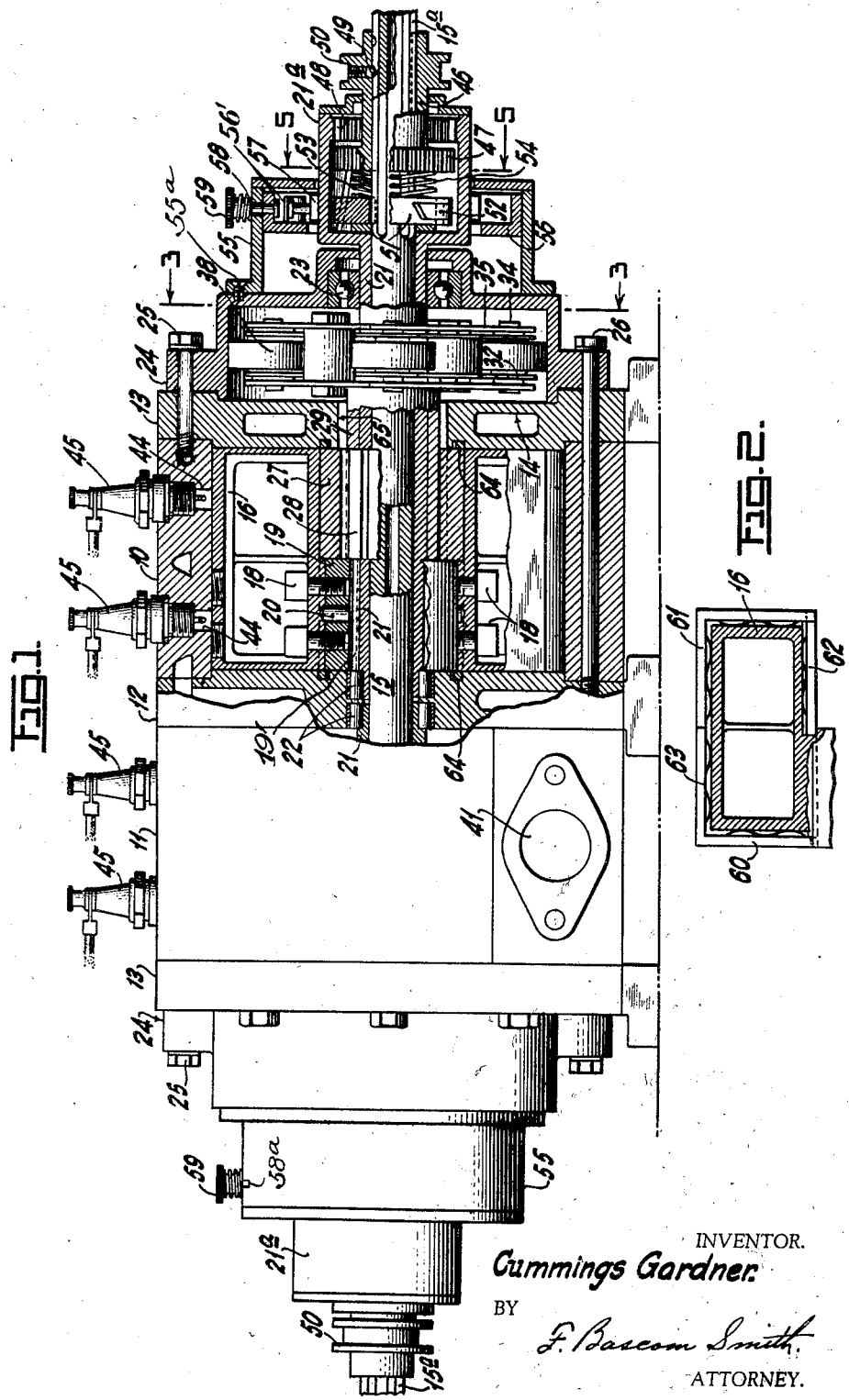

INVENTOR.
Cummings Gardner.
BY
G. Bascom Smith.
ATTORNEY.

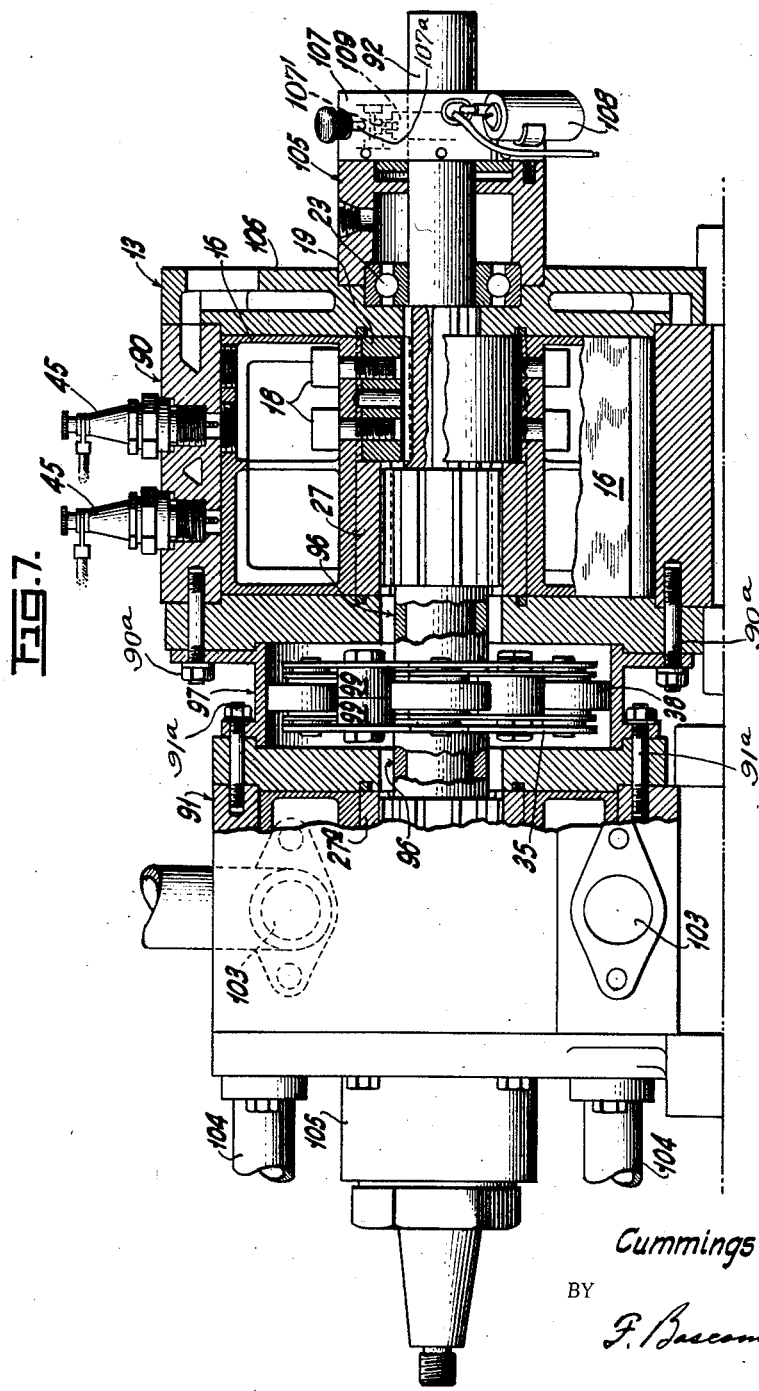

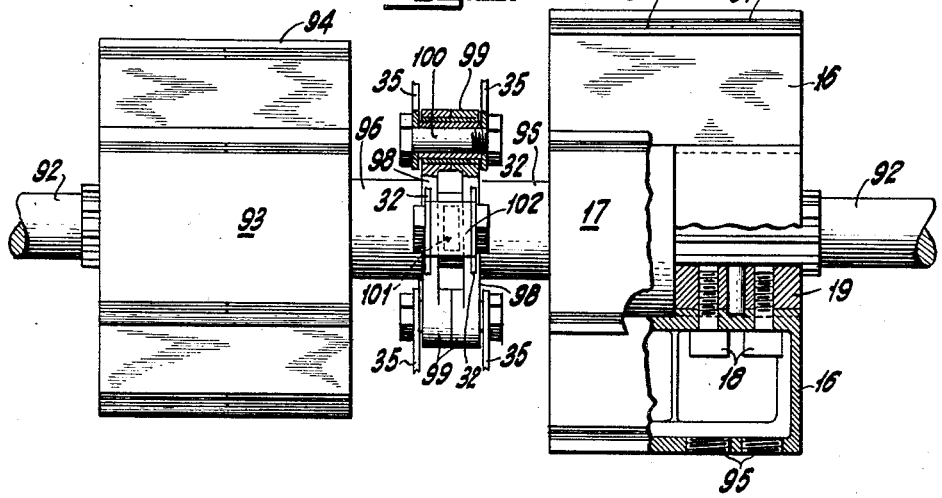
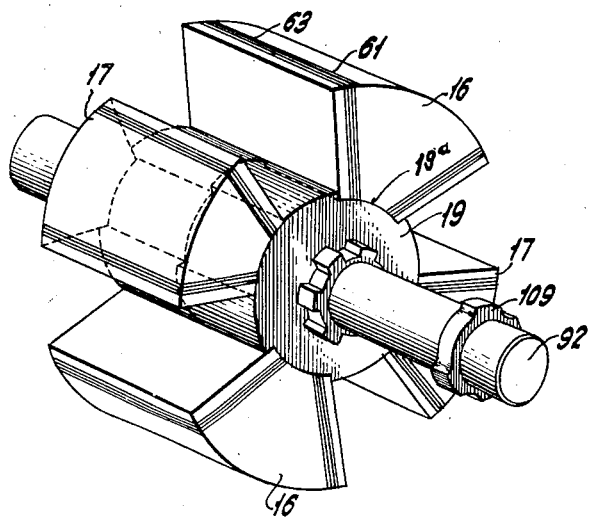
INVENTOR.
*Cummings Gardner.*
BY
ATTORNEY.

Patented Feb. 14, 1939

2,147,290

UNITED STATES PATENT OFFICE 2,147,290

ENGINE

Cummings Gardner, Los Angeles, Calif., assignor to Rotomotor Corporation, Washington, D. C., a corporation of Delaware Application March 25, 1933, Serial No. 662,702

12 Claims. (Cl. 123—11)

This invention relates to power plants and, more particularly, to internal combustion engines of the rotary type.

One of the objects of the present invention is to provide a novel power plant comprising a plurality of engines adapted to drive a common power shaft, the engines being operable separately or in combination.

Another object of the invention is to provide a novel two-cylinder power plant, each cylinder and its associated parts constituting a rotary engine adapted to drive a power shaft independently of, or in combination with, another similar engine.

Another object is to provide a novel power plant particularly adapted for use in aircraft, the construction being such that a straight and hollow power shaft may be used.

A further object is to provide novel means for operatively connecting an engine to, and/or disconnecting it from, a power shaft.

Another object is to provide novel timer mechanism for engines of the above character.

A further object is to provide a multiple cylinder rotary engine having common control means for all the pistons.

A still further object is to provide a novel double rotary unit, such as an engine and a compressor, each embodying relatively movable, sector-like pistons in combination with common control means therefor.

The above and other objects and advantages of the invention will appear more fully hereinafter in the detailed description which is to be read with the accompanying drawings. It is to be expressly understood, however, that the drawings are for the purpose of illustration only and are not designed as a definition of the limits of the invention, reference being had for this purpose to the appended claims. Referring to the drawings wherein like numerals refer to like parts throughout the several views, Fig. 1 is a side elevation, partly in section and with parts broken away, of a rotary internal combustion engine illustrating one embodiment of the present invention;

Fig. 2 is a detail view of one form of compression sealing means which may be employed;

Fig. 7 is a side elevation, partly in section and with parts broken away, of a rotary internal combustion engine illustrating a second embodiment of the invention;

Fig. 8 is a detail view, partly in section and with parts broken away, illustrating one form of control means which may be employed; and Fig. 9 is a detail perspective illustrating a preferred mounting for the pistons.

Figure 3:
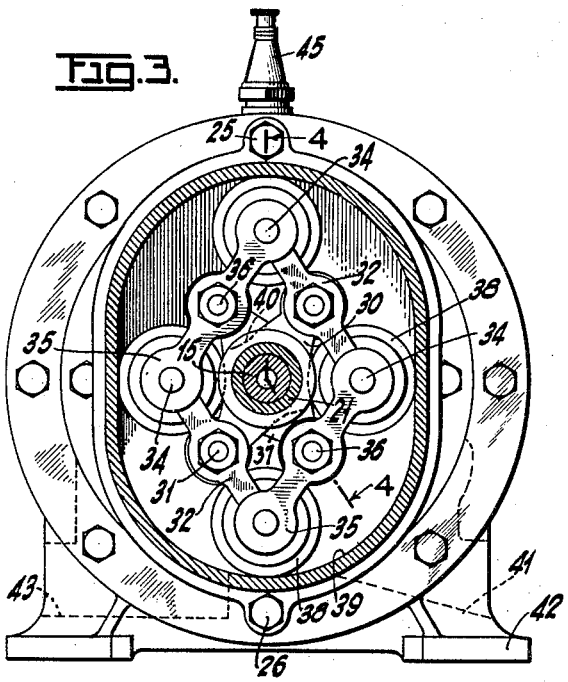
Fig. 3 is a sectional view taken on the line 3—3 of Fig. 1.

The power plant shown in Fig. 1 comprises a pair of cylinders 10 and 11 which are coaxially disposed and which are closed at their adjacent ends by means of a common end plate 12, the outer ends of said cylinders being closed by plates 13. The cylinders and end plates are cored out to provide passages 14 for a suitable cooling medium such as water. Each of the cylinders 10 and 11 have associated therewith mechanism constituting an internal combustion rotary engine, and the two engines are adapted to drive a common power shaft 15 or, if desired, either engine may be employed without the other to drive said power shaft as will be pointed out more fully hereinafter. The mechanisms provided in cylinders 10 and 11 and in the associated housings are duplicates of each other and accordingly only the mechanism of the right-hand engine of Fig. 1 will be illustrated and described in detail.

A plurality of sector-shaped pistons 16 and 17 are mounted for rotation within each of the cylinders. In the embodiment shown, four pistons are employed in each cylinder, the pistons being arranged in diametrically disposed and rigidly connected pairs. Pistons 16 are secured, as by means of allenhead screws 18 which pass through the inner walls of said pistons, to a hub 19 which is substantially one-half the length of said pistons, one end of the hub being substantially flush with one end of the piston. Preferably, the hub is provided with a longitudinally extending recess or groove 19a (Fig. 9) to receive a portion of the piston which projects slightly from the inner face of the latter, the projecting portion being substantially one-half the length of the piston, i. e., equal to the length of the hub. This construction, together with the screws 18 and a dowel pin 20, insure an extremely rigid connection between the pistons and the hub 19. The latter is rigidly connected, as by means of splines 19', to a hollow power shaft 21 which is adapted to be drivably connected to the power shaft 15, and which may be termed a cylinder power shaft.

The inner end of shaft 21 extends into an opening in plate 12 and is rotatably supported therein as by means of a suitable anti-friction bearing 22. The opposite end of said shaft is rotatably mounted, as by means of bearing 23, in a housing 24 which is provided for the control mechanism to be later described. Housing 24 is secured to end plate 13 as by means of bolts 25 and 26, said bolts also being adapted to secure the end plate to cylinder 10. In the form shown, bolts 26 extend through the flange of housing 24, end plate 13, cylinder 10 and into the center plate 12 whereby the parts are retained in operative relation.

Surrounding the hollow power shaft 21 within the cylinder, but annularly spaced therefrom, is a second hub 27 of the same length and outer diameter as hub 19. Pistons 17 (Fig. 6) are secured to this second hub in the same manner that the first-named pair of pistons are secured to hub 19. It will thus be seen that one-half of the pistons 16 overhang the hub 27 while one-half of the pistons 17 overhang the hub 19.

The pairs of pistons 16 and 17 are adapted for relative angular movement and, to this end, hub 27 surrounds and is secured, as by means of splines 28, to a sleeve 29 which surrounds power shaft 21 and extends from a point adjacent hub 19 outwardly through a suitable opening in end plate 13 to the control means mounted in housing 24. Preferably, needle bearings 29a (Fig. 4) are interposed between sleeve 29 and shaft 21.

The relative angular movement between pistons 16 and 17 must be controlled in a predetermined manner in order to create a suction within the cylinder whereby a combustible mixture may be drawn into the engine, to compress the charge thus introduced prior to the firing of the charge, and subsequently to exhaust the burned gases from the cylinder. Control means are provided for this purpose and, in addition, said control means are effective to convert the forces of explosion in the cylinder into a torque which is transmitted to power shaft 21 to rotate the same.

Figures 4, 5, 6:
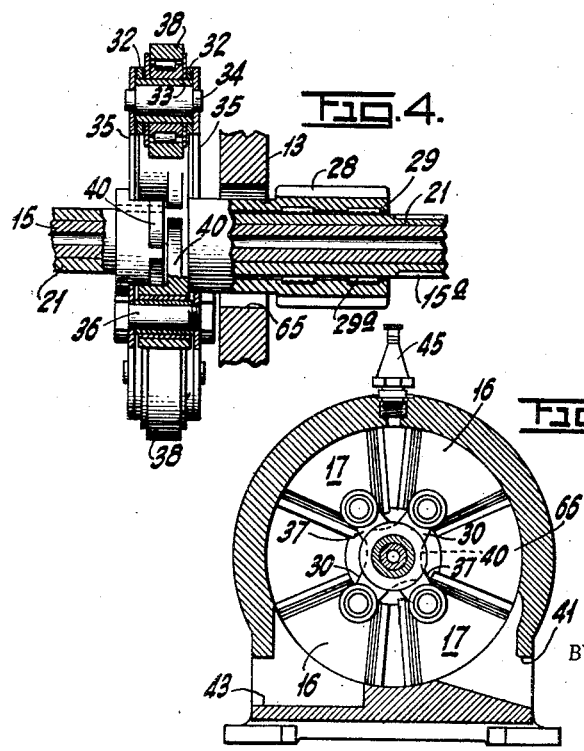
Fig. 4 is a detail view, partly in section and with parts broken away, the view being taken substantially on the line 4—4 of Fig. 3.
Fig. 5 is a sectional view taken on the line 5—5 of Fig. 1.
Fig. 6 is a detail view partly in section illustrating certain parts of the mechanism in firing position.

As shown more clearly in Figs. 3, 4 and 5, the control means comprises a pair of arms 30 which are rigidly connected to the power shaft 21. The opposite ends of said arms are apertured to receive bolts 31 constituting pivot pins for a pair of links 32, a link being positioned adjacent each end of the bolt, which latter passes through openings in the middle of the links. The outer ends of links 32 are apertured to receive a sleeve 33 (Fig. 4) which surrounds a pivot pin 34 having the opposite ends thereof of reduced diameter. Pairs of links 35 have pivotal connection with the reduced ends of the pins 34 and are pivoted intermediate their ends to bolts 36 constituting pivot pins. The latter extend through apertures in the ends of a pair of diametrically disposed arms 37 that are rigidly connected in any suitable manner as by means of splines, for example, to sleeve 29. There is thus provided a parallelogram construction comprising two pairs of links 32 and two pairs of links 35, all of which are of the same length as are the pairs of arms 30 and 37. The linkage described constitutes means for connecting pistons 17 to power shaft 21 and hence to pistons 16.

Means are provided for insuring that the linkage above described will impart a predetermined movement of oscillation to pistons 17 relative to power shaft 21 and pistons 16 whereby said pistons will have the necessary relative angular movement to carry out the firing cycle referred to above. For this purpose, sleeves 33 carry anti-friction rollers 38, one roller being provided for each corner of the linkage parallelogram, and said rollers have engagement with an internal cam 39 which, in the form shown, is constituted by the inner wall of housing 24. Preferably, the cam is generally elliptical in shape, the opposite end walls thereof being substantially semi-circular while the side walls are parallel for a major portion of their length. It will be noted that arms 30 and 37, having the projecting apertured portions, are recessed as at 40 to provide clearance for rollers 38, thus enabling rollers of large diameter to be employed without increasing the overall dimensions of the control mechanism. The arms are also so constructed that the centers of the pivot pins 34, 36, sleeves 33 and rollers 38 lie in a single plane disposed at right angles to power shafts 15 and 21.

Intake openings 41 are provided for each of the cylinders closely adjacent the cylinder base 42 which may be cast integral with the cylinder if desired. Each cylinder is also provided with an exhaust port 43 and with one or more threaded openings 44 to receive spark plugs 45. As will be understood by those skilled in the art, openings 41 may be operatively associated with one or more carburetors (not shown).

Novel means are provided for drivably connecting power shaft 21 of cylinder 10, or the similar power shaft 21 of the cylinder 11, with the main power output shaft 15 whereby the engines may be used separately or in combination to drive said main power shaft. For this purpose, hollow shaft 21 is provided on its outer end with an enlarged portion 21a constituting a housing for the clutch mechanism. The portion of shaft 15 within housing 21a is splined to receive a sleeve 46 which is adapted to rotate with, and to move longitudinally of, said shaft. The portion of sleeve 46 which extends within the housing 21a is provided with a disc 47 which is splined on the periphery thereof and which is adapted to be moved into driving engagement with splines 48 provided on the inner surface of housing 21a. When shaft 21 is disconnected from shaft 15, the sleeve and disc 47 occupy the position shown in Fig. 1 and are yieldingly retained in said position by a spring pressed ball 49. The projecting end of sleeve 46 is preferably provided with a grooved collar 50 to receive a shifting fork (not shown) for manually moving splined disc 47 longitudinally of shaft 15 out of engagement with splines 48 to the position shown in Fig. 1, whereby the two shafts may be disconnected.

Means are provided for automatically moving disc 47 into driving engagement with splines 48, said means being constructed so that said driving connection will be established when shafts 15 and 21 are in a predetermined angular relation. For this purpose, there is positioned in the housing 21a, and on the splined portion 15a of the power shaft, a disc 51 which carries a pawl 52 (Figs. 1 and 5) adapted to engage an angularly disposed ratchet 53 formed on the inner surface of housing 21a. Resilient means, such as a coil spring 54, surrounds shaft portion 15a and is interposed between disc 51 and disc 47.

When shaft 21 and housing 21a rotate in a counter-clockwise direction (Fig. 5) at a speed greater than that at which shaft 15 is rotating, the ratchet portion 53a engages the angled end of pawl 52 so that a definite angular relation is established between the shafts, and the inclined faces of the pawl and ratchet are effective to move disc 51 to the right (Fig. 1) to compress spring 54. When the latter has been compressed, it is effective to snap disc 47 to the right to engage the splines 48 and establish a driving connection between shafts 15 and 21. Disc 51 moves a further distance to the right, due to the torque being impressed thereon, against the tension of spring 54, whereupon the load is transferred to the splines, and shaft 21 is effective to drive shaft 15 independently or in cooperation with the shaft 21 in the other cylinder 11.

Novel timer mechanism is provided for controlling the flow of ignition current from a source such as a battery (not shown) to spark plugs 45. As illustrated, the timer mechanism comprises a flanged housing 55 suitably secured by means of screws 55a to control housing 24 and surrounding portion 21a of the cylinder power shaft. Positioned for limited angular movement within the housing 55 is a ring 56 carrying contact points 56', one of which is movable and adapted to be intermittently moved into contact with the other by means of a cam 57 formed on, or secured to, the periphery of housing 21a. The ring 56 receives a pin 58 which projects through an elongated slot 58a in the housing 55 and may be fitted with a knurled head 59. Movement of the pin in the slot is effective to angularly displace ring 56 and the contacts carried thereby relative to cam 57 on housing 21a, whereby the spark may be manually advanced or retarded.

Pistons 16 and 17 are provided with compression sealing means. As shown more clearly in Fig. 2, the sealing means or blades are constituted by overlapping elements, two of which are L-shaped, as shown at 60 and 61, and lie in a continuous groove in the piston and cooperate with a straight element 62. Suitable springs 63 are provided for urging the sealing blade elements 61, 62 into yielding engagement with the cylinder walls. In addition to the sealing blades carried by the piston, rings 64 are preferably fitted in circular grooves in the end plates to prevent the escape of gases of combustion between the adjacent hub and the end plate.

In operation, starter mechanism (not shown), which may have operative engagement with the projecting portion of shaft 21 or, in certain installations, with shaft 15, is employed to rotate said shaft and the pistons 16 and 17. As said pistons rotate past inlet 41 (Fig. 6), the control means, including the cam 39, are effective to retard the angular movement of pistons 17 relative to the constantly moving pistons 16. The chamber 66 provided between the adjacent faces of said pistons and the cylinder wall is thereby increased in volume, and the suction thus produced is effective to draw a charge into the chamber. Further rotation of the pistons and the elements of the control means is effective to increase the speed of pistons 17 with respect to pistons 16, whereupon the volume of chamber 66 is decreased and the combustible charge is compressed. When the pistons have rotated to such a position that the compressed charge in chamber 66 is opposite spark plug or plugs 45, the timer is effective to close the circuit to the plug, whereupon the charge is fired. The linkage of the control means now resolves the explosion forces into a resultant torque that is impressed on cylinder power shaft 21 whereby the latter is rotated. As the pistons continue to rotate in an anti-clockwise direction past the exhaust port 43, the control mechanism again moves pistons 17 at a rate faster than that at which pistons 16 are moving, whereby the volume of the chamber 66 is decreased and the burned gases are forced outwardly through said port.

If shaft 15 is being driven by cylinder power shaft 21 in cylinder 11 and it is desired to connect cylinder power shaft 21 in cylinder 10 to the main power output shaft 15, the engine constituted by the right-hand end of the structure is started, whereupon disc 51 and pawl 52 are effective to automatically engage splines 47 and 48 and establish the driving relation between the shafts. If it is now desired to disconnect engine 10 from shaft 15, sleeve 46 is manually moved to the left by means of collar 50, whereupon shaft 15 is driven by one engine only. Engine 10 is now stopped in order to prevent the driving connection to shaft 15 from being automatically reestablished. The clutch mechanism is so constructed that the driving connection between each engine shaft 21 and main shaft 15 is effected with said shafts in a predetermined relation, whereby when both engines are in operation, overlapping power impulses can be obtained. This insures a smooth output of power and, since all of the parts are coaxially mounted, the engine is free from vibration.

The embodiment of the invention illustrated in Fig. 7 comprises an engine having a cylinder 90 and a compressor having a cylinder 91, the cylinders being coaxially disposed and having a power shaft 92 extending therethrough. Pistons 16 and 17 within cylinder 90 are secured to hubs 19 and 27 in a manner similar to that described in connection with the structure of Fig. 1. As shown, the compressor is fitted with pistons 93 and 94 which are similar in all respects to those of pistons 16 and 17 except as to size. In this construction, as in the structure previously described, the piston holding screws 18 are introduced into the hollow piston through threaded openings in the outer face thereof and, after said screws have been engaged with the hub, the openings are closed by threaded and tapered plugs 95.

Common control means are provided for the pistons of the engine and the compressor so that these pistons have a movement similar to that described in connection with the embodiment shown in Fig. 1. For this purpose, sleeves 96, which are splined to the respective hubs 27 and 27a in cylinders 90 and 91, extend through openings in the adjacent end plates of the cylinders into a housing 97 for said control mechanism, the housing being secured by any suitable means, such as studs 90a and 91a extending through flanges on the housing, to the adjacent ends of cylinders 90 and 91. Each sleeve 96 is provided with a pair of diametrically disposed arms 98 provided at the outer ends thereof with apertured and longitudinally extending portions 99, the adjacent ends of said portions being in abutting engagement. The pairs of links 35 are pivotally connected to the arms as by means of the pivot pins 100 which extend through portions 99.

Shaft 92 is provided with a pair of diametrically disposed arms 101, the outer ends of which carry longitudinally extending and apertured portions 102 to which are pivoted the links 32. Except for the arrangement and construction of the arms 98 and 101, the control mechanism is similar to that described above in connection with the first embodiment of the invention. The cam for the rollers 38 is formed on the inner surface of housing 97. Since the control means moves the pistons 93 and 94 twice to compressing position during each revolution of said pistons, the compressor preferably includes two intake openings 103 and two outlets 104. By this arrangement, at the instant that a charge is being ignited in cylinder 90, maximum compression is obtained in the cylinder 91 of the compressor and the air or other fluid being compressed is discharged through one of the passages 104 to a suitable pressure tank.

Additionally, housing 105 may be secured to the end plate 106 of cylinder 90 to receive a lubricant under pressure, which lubricant may be conducted through suitable passages (not shown) drilled in shaft 92 to the various parts to be lubricated.

Timing mechanism for the spark plugs 45 is constituted by an annular member 107 which carries adjustable contacts 107' and a condenser 108, one of said contacts being movably mounted in any suitable manner and adapted for operative engagement with cam 109 mounted on shaft 92. An elongated slot 107a corresponding to and serving the same purpose as slot 58a in Fig. 1 is provided in housing 107 for rendering the timer contacts adjustable relative to power shaft 92.

There is thus provided a power plant of simple construction, light weight and small size. The structure is particularly adapted for use in airplanes where low head resistance is desirable. When used on military planes, the construction is particularly advantageous in that it eliminates the necessity for propeller timing mechanism for machine guns, the fire of the gun being directed through the straight, hollow power shaft. When large power output is required, both engines may be employed for driving the main power shaft, but either engine may be quickly disconnected with a consequent saving in fuel when a small power output only is required. The novel clutch mechanism disclosed insures that the two engines will be operatively connected to the common shaft in such a manner as to secure overlapping impulses when both engines are in use, thereby providing for smooth flow of power. If only a single cylinder engine is required, the second cylinder may be used as a compressor for general utility or for supercharging the engine.

It will be understood that a centrifugal type of compressor may be employed in the place of the construction shown if this is desired. Additionally, it will be seen that, by supplying spark plugs, timing mechanism and suitable ports, the compressor may be operated as an engine although overlapping impulses will not be secured when a single control means is used for both cylinders.

The use of common control mechanism reduces the weight and cost of manufacture, while the sealing means employed insures a high compression ratio and a high efficiency. The control mechanism is so constructed as to occupy a minimum of space, and it will be noted that a plane passing midway between the pairs of links at right angles to the power shaft passes through the centers of the arms and the rollers. No distributor is required since the charge is always fired at the same position in the cylinder. It has been found in actual test, however, that overheating does not result from this fact due to the capacity of the cooling passages and the rapid scavenging.

In engines of the rotary type employing sector-like pistons, heretofore provided, considerable difficulty has been experienced in rigidly connecting the pistons to the power transmitting member. The construction disclosed herein insures a rigid connection at all times between the pistons and sleeve and between the pistons and shaft due to the provision of the piston projecting portions and the recesses, whereby the forces of explosion are not transmitted solely by the retaining screws 18.

Various changes, as will now be readily seen by those skilled in the art, may be made in the details of construction and the arrangements of the parts, and reference will, accordingly, be had to the appended claims for a definition of the limits of the invention.

What is claimed is:

1. In a power plant, a pair of coaxially disposed cylinders, a power shaft extending through the cylinders, a hollow shaft in each of said cylinders surrounding said power shaft, pistons within each of the cylinders rigidly connected to each of the hollow shafts, a sleeve in each of the cylinders surrounding said hollow shafts and rotative relative thereto, pistons within each of the cylinders rigidly secured to each of said sleeves, means for controlling the rotary movement of the sleeve in each of the cylinders relative to said hollow shafts, and clutch mechanism for independently connecting the hollow shafts directly to the power shaft.

2. In a power plant, a cylinder, a power shaft extending coaxially through said cylinder, a hollow shaft surrounding the power shaft, a sleeve surrounding said hollow shaft, pistons within the cylinder operatively connected to the sleeve, pistons within the cylinder operatively connected to the hollow shaft, means for controlling the movement of said sleeve relative to said hollow shaft, and clutch means for establishing a direct driving connection between said hollow shaft and said power shaft, said clutch means being concentric with said shafts.

3. In a power plant, a cylinder, a straight power shaft extending therethrough, a hollow shaft surrounding said power shaft and extending exteriorly of the cylinder, a sleeve surrounding a portion of the hollow shaft, a portion of the sleeve extending exteriorly of the cylinder, pistons within the cylinder operatively connected to the hollow shaft, pistons within the cylinder operatively connected to the sleeve, control means including a cam housing secured to the cylinder for controlling the movement of said sleeve relative to the hollow shaft, and clutch means positioned exteriorly of the cylinder for connecting said power shaft directly to the hollow shaft.

4. In a power plant, a cylinder, a straight power shaft extending through the cylinder, a hollow shaft surrounding the power shaft and extending exteriorly of the cylinder, a sleeve surrounding the hollow shaft and adapted for angular movement relative thereto, pistons secured to said hollow shaft, pistons secured to said sleeve, means for controlling the movement of said sleeve relative to the hollow shaft, and means mounted exteriorly of the cylinder and responsive to relative rotational movement of said hollow shaft and said power shaft in one direction for directly connecting said last-named shafts.

5. In a power plant, a plurality of single cylinder rotary engines, each including a hollow shaft, a sleeve surrounding each hollow shaft and rotative relative thereto, pistons rigidly secured to each of said shafts, pistons secured to each of said sleeves, and means for controlling the rotary movement of each sleeve relative to the hollow shaft on which the same is mounted, a main power shaft extending through the hollow shafts, means responsive to relative movement of said hollow shafts and said power shaft for connecting any or all of said hollow shafts directly to said power shaft, and means for manually disconnecting the hollow shafts from said power shaft.

6. In a power plant, a power shaft, a hollow shaft surrounding the power shaft and having an enlarged portion, the portion of the power shaft within the enlarged portion being splined, a clutch member mounted on the splined portion of the power shaft and adapted to be moved into driving engagement with the enlarged portion, and means for yieldingly moving said clutch member into driving engagement with the hollow shaft, said means including a disc mounted for axial movement on the power shaft, a pawl carried by the disc, and resilient means interposed between the disc and said clutch member.

7. In an engine, a main power shaft, a hollow shaft having an enlarged portion surrounding said power shaft, a member mounted on the power shaft for rotary movement therewith and movement longitudinally thereof, means within said enlarged portion adapted to be drivably engaged by said longitudinally movable member, a member operatively connected to said power shaft and adapted when the hollow shaft rotates at a speed greater than that of the power shaft for moving said longitudinally movable member into driving position whereby said shafts are drivably connected in a predetermined angular relation and yielding means interposed between said longitudinally movable member and the second named member.

8. In a rotary engine of the class described, a cylinder, a shaft extending through the cylinder, a sleeve surrounding and rotative relative to said shaft and extending exteriorly of the cylinder, pistons within the cylinder connected to said shafts, pistons within the cylinder connected to said sleeve, means for controlling the rotary movement of said sleeve relative to said shaft, means within the cylinder for igniting a combustible charge therein, and means for timing the operation of said ignition means including a cam rotatable with said shaft and a pair of electrical contacts adapted to be angularly adjusted relative to the axis of said shaft.

9. In a power plant, a pair of cylinders, an end plate common to said cylinders, a power shaft extending through the cylinders, a hollow shaft in each of said cylinders surrounding the power shaft, a sleeve in each of said cylinders mounted on said hollow shafts for angular movement relative thereto, pairs of pistons within the cylinders mounted on said hollow shafts, pairs of pistons within the cylinders mounted on said sleeves, means associated with each cylinder for controlling the movement of each sleeve relative to the hollow shaft on which the same is mounted, clutch means for drivably connecting said hollow shafts directly to the power shaft whereby the former may drive the latter either independently or in unison, means in each cylinder for igniting a combustible charge therein, and means for timing the operation of said last-named means including a cam operatively connected to each of said hollow shafts.

10. In a power plant, a pair of cylinders, a power shaft extending coaxially through the cylinders, a hollow shaft in each cylinder extending exteriorly thereof and surrounding said power shaft, a sleeve in each cylinder mounted on said hollow shafts for angular movement relative thereto, pistons in each cylinder rigidly connected to said hollow shafts, piston in each cylinder rigidly connected to said sleeves, control means for controlling the angular movement of each of said sleeves relative to the hollow shaft on which the same is mounted, clutch means for drivably connecting each of said hollow shafts directly to the power shaft, means in each cylinder for igniting a combustible charge therein, and means for timing the operation of said last-named means including a member rigidly connected to and rotatable with each of the hollow shafts.

11. In a power plant, a single cylinder rotary engine, a power shaft extending through the cylinder, a hollow shaft in said cylinder surrounding the power shaft and adapted to rotate uniformly during operation of the engine, a sleeve mounted on said hollow shaft within the cylinder for angular movement relative thereto, pistons within the cylinder operatively connected to the hollow shaft, pistons within the cylinder operatively connected to the sleeve, control means for controlling the movement of the pistons on said sleeve relative to the pistons on said hollow shaft, and clutch means concentric with said shafts for establishing a disengageable driving connection therebetween.

12. In a power plant, a plurality of rotary engines, a hollow shaft in each engine, a power shaft extending coaxially through said hollow shaft, a sleeve in each engine mounted on said hollow shafts for angular movement relative thereof, pairs of pistons mounted on said hollow shafts, pairs of pistons mounted on said sleeves, control means for controlling the movement of one of the pairs of pistons in each engine relative to the other pair, said control means being independent of the power shaft, and clutch means concentric with said hollow shafts and power shaft for connecting each of the former directly to the latter.

CUMMINGS GARDNER.